Figure 1:
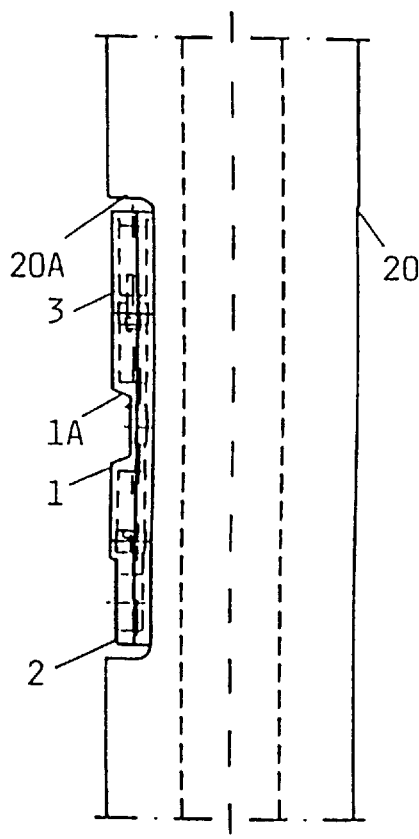

ID=1 />

United States Patent [19]
Krokstad et al.

[11] Patent Number: 5,877,996
[45] Date of Patent: Mar. 2, 1999

[54] TRANSDUCER ARRANGEMENT

[75] Inventors: Asbjørn Krokstad; Svein Mjaaland, both of Trondheim; Erik Iversen Nakken, Hundhamaren, all of Norway

[73] Assignee: Den Norske Stats Oljeselskap A.S, Stavanger, Norway

[21] Appl. No.: 648,004

[22] PCT Filed: Nov. 16, 1996

[86] PCT No.: PCT/NO94/00183

§ 371 Date: Jul. 15, 1996

§ 102(e) Date: Jul. 15, 1996

[87] PCT Pub. No.: WO95/14845

PCT Pub. Date: Jun. 1, 1995

[30] Foreign Application Priority Data

Nov. 23, 1993 [NO] Norway .................................. 934224

[51] Int. Cl.[6] .............................. G01V 1/40; E21B 47/026
[52] U.S. Cl. .............................. 367/31; 367/35; 181/104; 175/45
[58] Field of Search .................................. 367/27, 30, 31, 367/35; 181/104, 105, 112; 175/45; 324/357, 369

[56] References Cited

U.S. PATENT DOCUMENTS

| 4,353,122 | 10/1982 | Cubberly, Jr. ........................... 367/25 |
| 4,606,014 | 8/1986 | Winbow et al. ........................ 181/104 |
| 4,742,495 | 5/1988 | Medlin et al. .............................. 367/31 |
| 4,744,416 | 5/1988 | Bower ..................................... 166/253 |
| 5,045,795 | 9/1991 | Gianzero et al. ........................ 324/369 |
| 5,144,591 | 9/1992 | Hardage .................................... 367/31 |
| 5,146,050 | 9/1992 | Strozeski et al. ....................... 181/104 |
| 5,357,481 | 10/1994 | Lester et al. ............................... 367/31 |

FOREIGN PATENT DOCUMENTS

| 1184880 | 3/1970 | United Kingdom . |
| 93/07514 | 4/1993 | WIPO . |

*Primary Examiner*—Nelson Moskowitz
*Attorney, Agent, or Firm*—Foley & Lardner

[57] ABSTRACT

Transducer arrangement for use as receivers in acoustic borehole measurements, in particular for the purpose of geological steering, stratigraphic imaging and control during drilling of deviated and horizontal wells, whereby transducer sensitivity is focused generally in radial directions normal to the drill string axis in close proximity to the drill bit (45). Two separate and substantially similar transducer elements are adapted to be located at substantially the same axial position along the drill string axis. The transducer elements having their output terminals interconnected with opposite polarities, so as to have a combined minimum response to incident acoustic waves and vibrations being identical at both transducer elements.

14 Claims, 4 Drawing Sheets

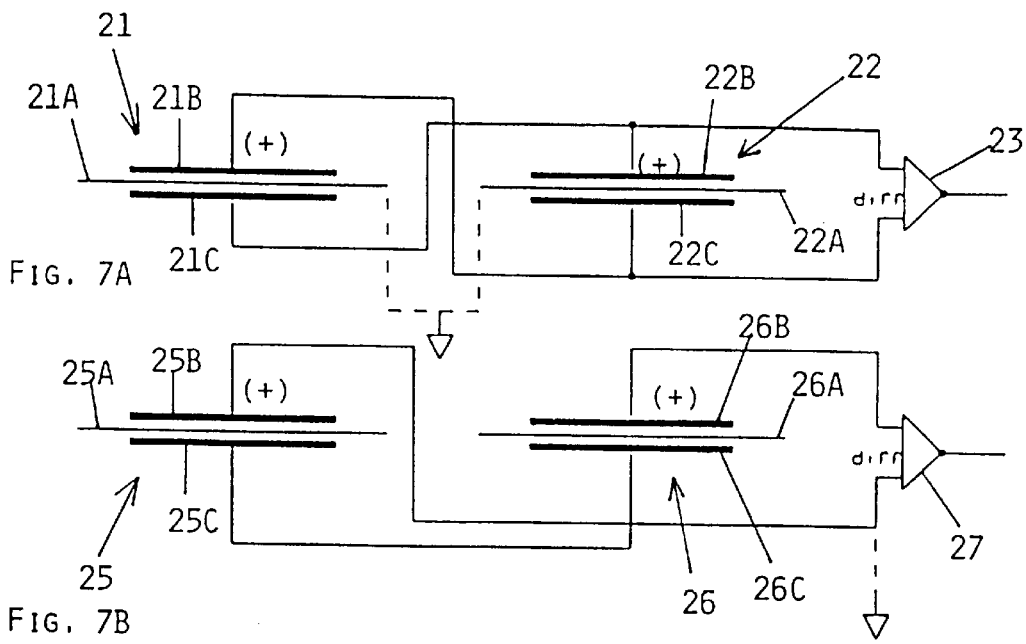
FIG. 7A
FIG. 7B
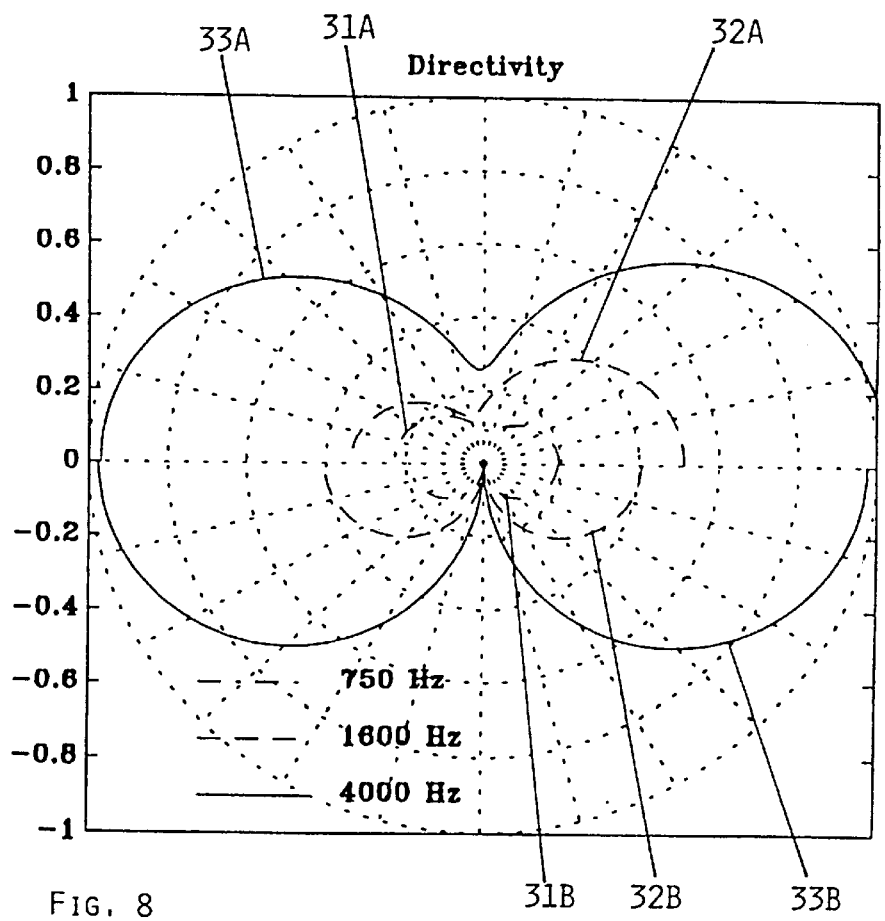
FIG. 8

TRANSDUCER ARRANGEMENT

This invention relates to a transducer arrangement for use as receivers in acoustic borehole measurements, in particular for the purpose of geological steering, stratigraphic imaging and control during drilling of deviated and horizontal wells, whereby transducer sensitivity is focused generally in radial directions normal to the drillstring axis in close proximity to the drill bit.

Various methods are known for use before and during drilling to provide information of importance to decisions being taken and control being effected during the drilling operations. Decisions on oil and gas reservoir target locations and well paths are primarily based on 2 and 3-D surface seismic surveys combined with well logs from nearby wells. During drilling it is very useful to know the drill bit position relative to the seismic section concerned. However, an exact vertical depth match between the geological prognosis from seismic surveys and drill bit position is not easily available. Formation velocity profiles are normally provided after drilling from wireline operated sonic logs and borehole geophysical surveys, i.e. Vertical Seismic Profiling (VSP).

For all wireline and drillpipe conveyed services, drilling must be stopped and the drill string pulled out of the hole prior to the survey. Borehole seismics of this kind offer useful post-drilling information about the subsurface structural features and the well trajectory relative to these. However, the well may already be in the wrong place in relation to geological zones of interest.

Wellsite petrophysicists, geologist and directional drillers today use formation evaluation logs based on Measurement While Drilling (MWD) and Logging While Drilling (LWD) in addition to directional surveys to determine well location on the geological map predicted from seismic data and from nearby wells. MWD and LWD logs can confirm whether the target zone is met at the predicted depth or not, and thereby give the driller a real time guidance on the depths and direction to head for. Natural gamma ray and resistivity devices constitute supplementary means for obtaining useful information in this connection. The major problem with current petrophysical devices is the very shallow depth of penetration, mainly less than 1–2 meters into the surrounding formations.

To overcome problems related to mal-positioning of the well path due to uncertainties in survey data and seismic maps, MWD borehole sonar methods have been proposed. The main objective of such methods and devices is to allow high precision detection and interpretation of rock strata and fluid contacts sideways and ahead of the drill bit.

Reference is made to the system described in international patent application, publication number WO93/07514. This international patent publication relates to a system and method for performing seismic prospecting and monitoring during drilling of a well. Both acoustic and electromagnetic energy is employed. The energy may be imparted by the drilling operation itself, or may be generated by another downhole source. Acoustic sensors employed may have their direction of sensitivity in a radial direction from the axis of the drill string or drill string tool.

The present invention is particularity directed to be applied during drilling of highly deviated and horizontal wells. As in the known system just referred to, this invention comprises a seismic source and a receiver or sensor array incorporated into the drill string closely behind the drill bit. A stratigraphic image is obtained showing reflections from dipping and horizontal layers above and below the well path. A continuous lateral survey coverage is provided, from which the variations in formation velocities, formation dip angle and the well path depth relative to the near-wellbore geological layers can be extracted. This type of remote information combined with conventional MWD directional survey data enables true real-time steering of the well path in the process of landing the well efficiently into the reservoir, providing stratigraphic control and keeping the well within the reservoir once it is entered. Typical range for such a system is 20–50 meters.

Current array sonic tools have been capable of detecting layer boundaries out to a distance of about 15 meters. However, significant signal processing power is required to enhance and separate these small amplitude reflections or events from direct waves in the borehole fluid and refracted waves along the borehole wall. Sensitivity to vibration noise generated by the drilling operation is also a serious problem in this connection. As already mentioned above, directional acoustic receivers or sensors are required to solve these problems. Thus, what is needed is a transducer arrangement which has a minimum of sensitivity in the axial direction of the drill string in which such a receiver/transducer arrangement is mounted.

This is obtained with the transducer arrangement according to the present invention, the novel and specific features of which primarily consist in two separate and substantially similar transducer elements adapted to be located at substantially the same axial position along said drill string axis, said transducer elements having their output terminals interconnected with opposite polarities, so as to have a combined minimum response to incident acoustic waves and vibrations being identical at both of said transducer elements.

The solution according to the invention represents an advanced concept providing accurate and high resolution monitoring of the drill bit location with reference to the local rock strata, e.g. reservoir boundaries and gas/oil contact during drilling. This information in combination with directional survey data provides a tool for monitoring, planning and adjusting well direction on a real time basis. An MWD tool comprising this transducer arrangement will also be a valuable aid for formation evaluation logging and improving interpretation of the surface seismic survey.

The transducer is designed to be operating when drilling is in progress, and can possibly use the drill bit transmitted energy as an acoustic source signal. However, another or active sound source will usually be preferred in actual practice. During active drilling the vibrational and acoustic noise levels at the transducers greatly exceed the levels of reflected signals. With the transducer arrangement according to the invention a highly improved signal-to-noise ratio is obtained. Most aspects of this novel transducer design are of interest even when logging while the drilling is stopped, then of course using a dedicated, active sound source.

Figure 2:
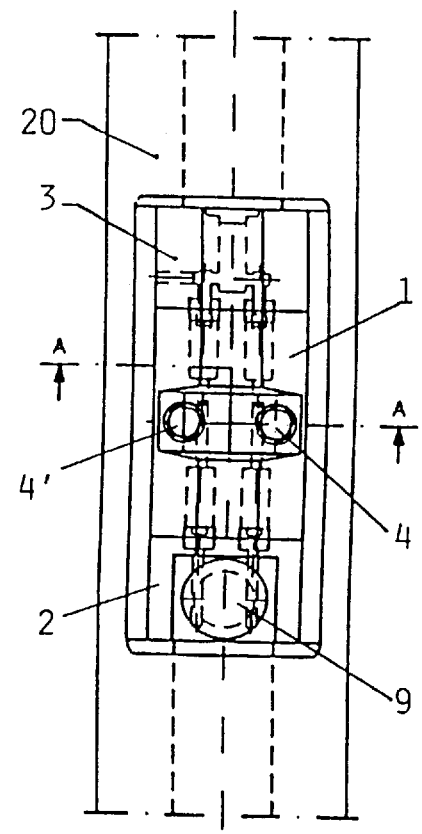
Figure 3:
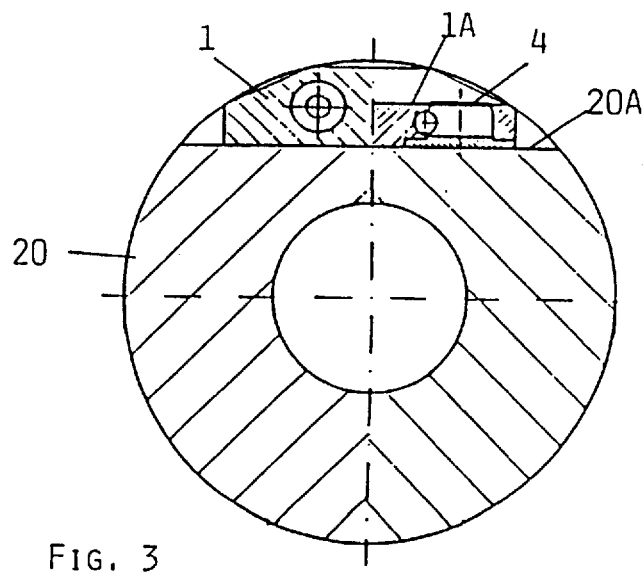
Figure 4:
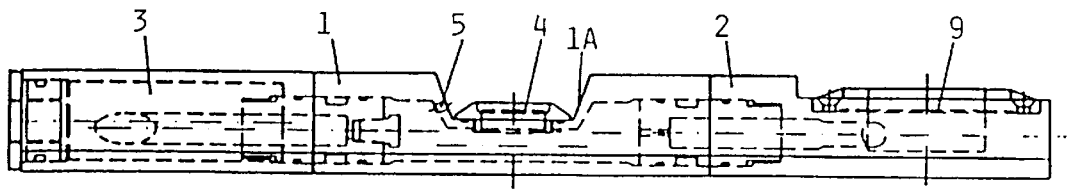
Figure 5:
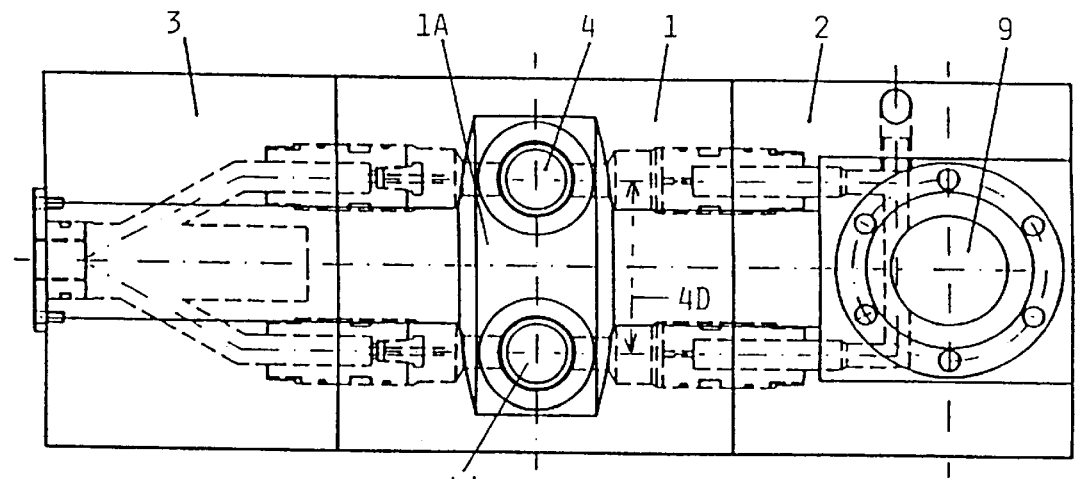
Figure 6:
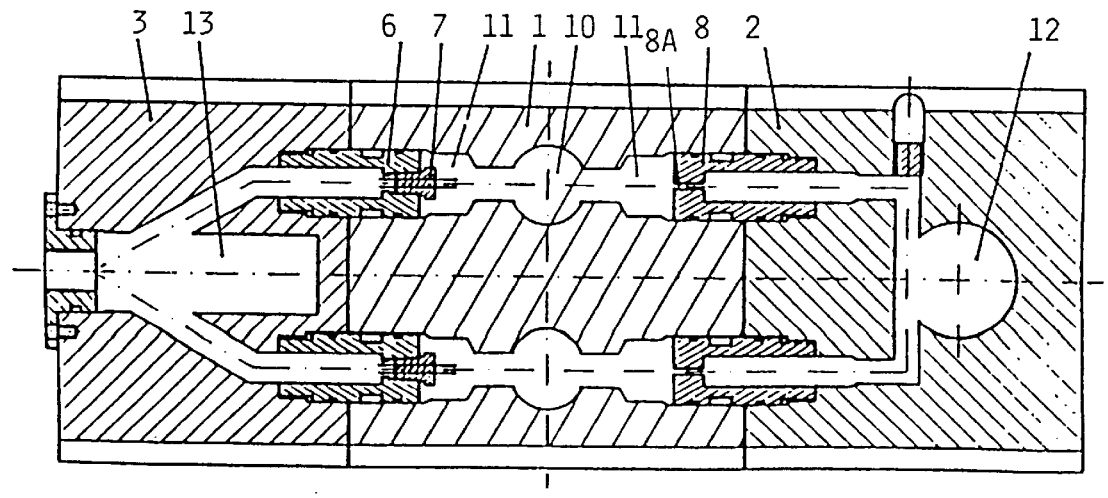
Figure 9:
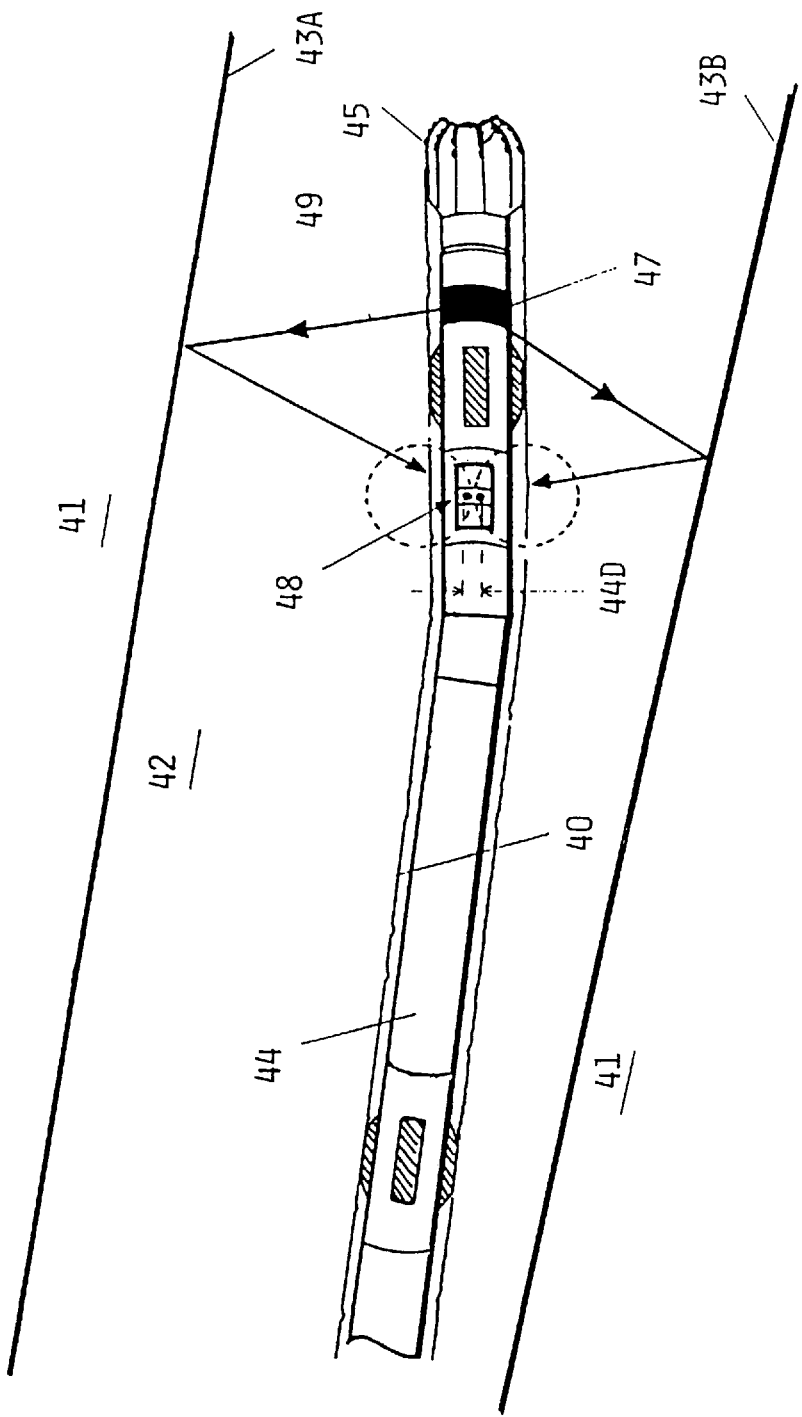

In the following description referring to the drawings, the transducer arrangement according to the invention as well as additional specific features and further advantages thereof, shall be described more in detail. In the drawings:

FIG. 1 in simplified view shows a length of drill collar in which an embodiment of the transducer arrangement is mounted, FIG. 2 shows the same arrangement as in FIG. 1, in front elevation, FIG. 3 shows a cross section along the line A—A in FIG. 2, FIG. 4 shows the transducer arrangement in FIGS. 1, 2 and 3 separately in longitudinal elevation, FIG. 5 shows the same transducer arrangement in top view, FIG. 6 shows the same arrangement as in FIGS. 4 and 5 in longitudinal section, FIG. 7A schematically shows an arrangement with two transducer elements connected in parallel (anti-parallel), FIG. 7B shows an arrangement with two transducer elements connected in series (opposite polarities), FIG. 8 is a diagram showing the directivity of a transducer arrangement according to the invention, and FIG. 9 is a simplified illustration of a drill string tool comprising an acoustic source or transmitter and alternative transducer configurations based on the arrangement according to the invention, along the drill string or tool.

The present transducer arrangement or MWD sensor is designed to fit within the shape and the size of a drill collar/sub 20 for example of 6.5" diameter (see FIGS. 1–3). To avoid more than necessary weakening of the drill collar/sub 20, oil reservoirs and electronics containers in the arrangement are extended rather in the length than in the depth of the collar. Since the transducer is adapted to operate in a liquid environment, i.e. drilling fluid or mud, it will also be referred to as "hydrophone" in the following description.

As seen on FIG. 1, the hydrophone consists of three main parts: The hydrophone central housing 1, the pressure compensator housing 2 and the electronics housing 3. As seen in particular from FIGS. 2 and 5 there are provided two separate transducer elements 4,4' which may be of the membrane or bender type element. The two benders 4,4' in the central housing 1 are made in a preferred embodiment by cementing two 20 mm diameter 0.5 mm thick piezoelectric ceramic discs to a 0.25 mm steel disc. The benders are precision cut by laser to 21 mm diameter for example after cementing, and laser welded to steel rings which are screwed into the central housing 1. The ceramic discs on the outside of bender elements 4,4' are connected to leads inside the housing 1 by means of electrical feedthroughs 5 (FIG. 4). Outside solderings as well as outside ceramics are covered with heat and borehole mud resistant flexible rubber compound (not shown) to prevent wear from mud flow or any other mechanical stress. Such rubber covering can be applied so as to more or less fill a lateral recess 1A within which the bender elements 4,4' are mounted. Under each bender there is a cavity 10 which is connected to two oil reservoirs 11 through an axial bore (see in particular FIG. 6). In FIG. 6 details are depicted only with respect to bender element 4 (FIG. 5), but similar details are seen also in connection with bender 4'.

At one side the central housing 1 is connected to the pressure compensation housing 2 by axial screws (not shown). The connection is guided by two O-ring sealed guide pins with fluid passages or throttling valves 8. Through these throttling valves, which may be 2 mm diameter 10 mm long bored passages, the oil reservoirs 11 are connected to an oil filled pressure compensation cavity or reservoir 12. A rubber diaphragm is provided here as a pressure compensation diaphragm 9.

On the other side the central housing 1 is connected to the electronics housing 3 by axial screws (not shown). The connection is guided by two O-ring sealed guide pins 6. In the center of each guide pin there is an electrical feedthrough 7 connecting the leads from the benders 4,4' to the electronics housing 3.

FIGS. 1, 2 and 3 show one hydrophone 1,2,3 mounted to a drill collar/sub 20 countersunk in a milled groove 20A. Hydrophones of said type can be arranged in a number of different antenna and downhole source configurations; with arrays of hydrophones along the drill string, two hydrophones can be positioned on either side of the string or rotated with smaller angle, hydrophones can be placed on both sides of the source (see FIG. 9). The pointing direction of the hydrophone or antenna is determined by magnetic or gravity toolface measurements from conventional directional survey instruments or with built-in magnetometers and accelerometers. In addition to the rubber compound mentioned above, the hydrophones may be protected by a protection ring/cylinder (not shown) mounted on the outside of the drill collar/sub 20 with screens to allow signal transmission.

From the above description with reference to FIGS. 1–6 it is important to note that the two separate transducer or bender elements 4,4' are located substantially in the same or common radial plane, i.e. the same axial position relative to the drill string axis through the drill collar or sub 20. As will be explained further below, this arrangement of the two transducer elements is essential to the favourable directivity obtained with the present transducer arrangement. Moreover the lateral spacing 4D (FIG. 5) between the two transducer elements 4,4', measured in particular between the central parts thereof, should be equal to or <½ wave length of the maximum acoustic frequency to be received. An additional feature being significant in actual practice, consists therein that the two transducer elements are selected from a supply of such elements upon measurement of relevant parameters so as to secure an optimal matching or similarity between the two elements in each pair or transducer arrangement.

Finally with reference in particular to FIGS. 4 and 5 the two transducer or bender elements having each substantially a plannar configuration, are aligned in a common plane within the recess 1A, extending transversally to the axial or longitudional direction of the transducer housing 1,2,3, (as a whole) and of drill collar 20.

There are a number of strict requirements to a transducer arrangement or hydrophone for use in a drill string and at considerable borehole depths. The transducer elements 4,4' must accept static pressures up to 100 MPa (1000 bar) without bringing main parameters out of the range of proper functioning. This requirement excludes the use of air backing of the transducer elements. The stiffness of an air backing is increasing linearly with the static pressure. If air backing is a part of the total stiffness, the resonance frequency will increase drastically with static pressure. A transducer withstanding this pressure, will have a very low sensitivity.

The transducer must therefore be pressure compensated as already described above. The static pressure must have access to both sides of the transducer membrane. At low frequencies the transducer must be of the pressure gradient type.

Based on the spectrum of emitted sound and on transmission losses, the probable frequency range for operation should be 1000–4000 Hz. The pressure compensation, or mechanical highpass filter, may therefore be used up to a frequency of 1000 Hz. The outside pressure must have access to the back of the bender or membrane elements 4,4' through an acoustic lowpass filter with a frequency limit somewhat lower than 1000 Hz. The throttling valves 8 described above with reference to FIG. 6 have the effect of such a lowpass filter. The pressure gradient principle may be used even in the active frequency range if its directivity is accepted. The pressure compensation introduce a reduction in sensitivity by 12 dB/octave from the limiting frequency (high pass).

The problem of mechanical vibrations of the drill string is very important in connection with this invention. Resilient mounting and reduced mass do not prevent noise from mechanical vibrations, which is coupled to the transducer by fluid backing or the fluid load in front of the membrane. A balanced transducer arrangement as described will reduce the excursion of the membrane and the demands on the associated preamplifier. Due to the long wavelength of the important frequency range of mechanical vibrations, two opposite phased and equal transducer elements may cancel vibrations of the string. The pair of elements will act as a pressure gradient system for acoustic excitation. Opposite phase here means that the output terminals of the two elements are interconnected with opposite polarities, either by direct hard wiring or through separate preamplifiers. This is further explained below, in particular with reference to FIGS. 7A and 7B.

Directivity of the transducer arrangement will reduce the noise and the influence of paths of transmission along the axis of the drill string which do not represent reflections from rock strata or fluid contacts. Thus, it is of great benefit to use a transducer arrangement with a low sensitivity in the axial direction of the drill string.

A pair of transducers or bender elements 4,4' located across the drill string collar 20, preferably facing the same direction as shown in FIGS. 1–6, will have the directivity diagram of the "figure of eight" and a node of no sensitivity along the drill string. The combination will have a node even in directions of possible reflected signals. However, measurements taken in rotational mode will scan all possible angles of incident. With steerable drilling assemblies, tool face angle has to be changed in discrete steps or a configuration of two pairs of transducers forming an orthogonal set of axis can be applied which will cover all possible angles of incident.

FIGS. 7A and 7B schematically illustrate two different examples of electrical connections around an arrangement of two transducer or bender elements, i.e. the pair of elements 21 and 22 in FIG. 7A and the pair of elements 25 and 26 in FIG. 7B. These two pairs of elements correspond of course to the two transducer elements 4 and 4' illustrated in FIGS. 1–6. A vibration of the drill string produces signals in both transducer elements in the pairs. Ideally, these two vibration signals are equal in amplitude, phase and direction. It is strongly desired to remove the vibration signal, while still keeping the sound signal. Since both vibration and sound signals appear in the same frequency band, it is not easy to do this by frequency filtering. According to the present invention, the solution is to subtract one transducer signal from the other. If the idealized statement on phase, amplitude and direction is correct, then the difference signal, "diff" in FIGS. 7A and 7B will have no vibration component due to the drill string. Sound signals, however, may hit the transducer arrangement at an other angle, which depending on frequency, gives a phase difference in the sound components at the two transducer elements, for example elements 21 and 22 in FIG. 7A. This phase difference causes a sound component to appear at "diff", i.e. the input to amplifier 23.

The dynamic range of the mixed sound/vibration signal in connection with drilling operations of the kind contemplated here, is supposed to be more than 100 dB. This is not easy to handle in practical active electronic components. Thus, it is an advantage to make a passive subtraction by simply wiring the two transducer elements together in a differential way (see FIGS. 7A and 7B). The difference signal is then amplified through an active network 23 and 27, respectively. Assuming the vibration of both transducer elements 21/22 and 25/26 respectively to be identical (see above), the dynamics of the "diff"-signal is significantly lowered.

The structure of each transducer or bender element can be seen for example from FIG. 7A, element 21. This is the component that converts sound pressure into voltage. It comprises a metal or steel plate 21A having at both sides ceramic discs 21B and 21C of piezoelectric material. The sound pressure (or vibrations) bends the metal plate 21A. This gives a volume change in the ceramic disc "pickup" and thus an electric voltage across it. Thus a voltage is generated across the bender element 21.

The two ceramics discs 21B and 21C in element 21 are mounted with opposite polarity, so that a bending of the element gives an overall bender polarity as marked (+) in FIG. 7A. To form a gradient hydrophone or transducer arrangement according to this invention, two bender elements as shown in FIGS. 7A and 7B respectively, are needed. In practice therefore, this makes possible the two different configurations of FIGS. 7A and 7B.

The two transducer elements 21 and 22 in FIG. 7A are parallel coupled or rather connected in anti-parallel, which is a preferred embodiment. This gives a source impedance of $1/jwC_c$, where $C_c$ is the capacity of one ceramics disc. Each bender element 21, 22 may be grounded, as indicated in FIG. 7A, which will demand a differential input amplifier 23.

The two transducer or bender elements 25 and 26 in FIG. 7B form a serial coupling. This gives a source impedance of $4/jwC_c$. This coupling technique requires insulation of the bender discs 25B, 25C and 26B, 26C from ground, but the input amplifier 27 may be single-ended (as indicated in the figure). The technique of insulating the bender discs from signal ground introduces some mechanical problems, so the anti-parallel arrangement of FIG. 7A is presently preferred.

As described above, two identical separate transducer elements in a balanced dipole configuration (opposite phase) may have several benefits if symmetry and pressure compensation is properly utilized. Thus, reverting to FIGS. 1–6, two circular piezoelectric bender elements 4,4' are mounted at the surface of the drill string collar 20, centres for example 6 cm apart. The oil-filled backing cavity 10,11,12 is shallow and has its largest dimension in the direction along the drill string axis. The cavity 10–11 is made as shallow as possible as this is believed to reduce the inertial forces of the oil behind the bender elements 4,4'. This is done to avoid large deflections of the bender elements because of transversal vibrations of the string and collar 20.

When, as described, the transducer elements are connected in opposite phase, the configuration cancels signals from longitudinal and torsional vibrations. Signals from transverse vibrations are partially cancelled. Both noise and active signal transmitted directly from the drill bit are also cancelled.

Reference is now made to FIG. 8.

Using measured frequency response data, the directivity pattern for an MWD transducer or sensor prototype (not mounted onto a drill collar), can be calculated as shown in the upper part of FIG. 8. Due to phase difference between the two bender elements employed at 750 Hz and 1.6 kHz, an oblique directivity pattern occurs as shown with curves 31A and 32A, respectively. At 4 kHz, the phase difference is very small, yielding a nearly perfect directivity function 33A. The corresponding theoretical curves 31B, 32B, 33B calculated for identical bender elements are shown in the lower part of FIG. 8. To achieve a good directivity function at all frequencies, a selection method must be used in order to pick good matched pairs of bender elements prior to the assembly of the complete sensor or transducer arrangement.

According to the above description the solution to the problems discussed in the introductory part, is presented here in the form of pairs of receiver transducer elements in a dipole configuration, whereby the transducer arrangement will obtain the directional sensitivity which is desired.

Turning now finally to FIG. 9, there is shown a practical embodiment of this transducer arrangement employed during a drilling operation. Borehole 40 is being drilled through a formation 42 having boundary layers 43A and 43B facing another formation 41. At the bottom-end of a drill string there is provided a drill collar or tool 44 at the outer end of which a steerable drill bit 45 is mounted. Closely behind the drill bit an acoustic source 47 is shown, emitting sound waves illustrated at 49, these being reflected from boundary layers 43A and 43B, and are detected by an antenna configuration which in this case consists of 2 diametrically mounted transducer pairs indicated at 48. Each pair in this antenna array is a transducer arrangement consisting of a pair of bender elements as described before. At 44D the lateral spacing between the two elements in each pair is indicated. Several transducer pairs may be provided along tool 44.

In actual operation the distance to the reflecting boundary layer 43 from the borehole axis is determined by measuring the propagation time and from knowledge regarding the seismic velocity in the formation 42. With the transducer arrangement described above, it is possible to detect the reflected signals without these being masked by undesired signals propagating along and within the borehole 40 as well as through the drill string itself. These acoustic range measurements will also be combined with inclination, azimuth and toolface measurements to determine stratigraphic dip-angles and to tie the local rock strata to geometric positions.

In the above description the transducer arrangement has also been denoted a gradient hydrophone or dipole transducer, but it will be understood that the basic principles behind this invention are the same in spite of the somewhat varied terminology used.

We claim:

1. A transducer arrangement for borehole measurements, the transducer arrangement comprising:

two separate and substantially similar transducer elements adapted for positioning along a drill string axis in close proximity to a drill bit, said two transducer elements being located at substantially a longitudinally common position, said transducer elements having their output terminals interconnected with opposite polarities, whereby acoustical waves and vibrations being substantially identically incident on both of said transducer elements produce a minimum combined response, lateral spacing between central parts of said two transducer elements being ½ or less of the wavelength of a maximum receivable acoustic frequency, a common liquid-filled reservoir being connected to one side of each transducer, and a diaphragm at least partially separating said reservoir and the ambient environment.

2. The transducer arrangement according to claim 1, wherein said two transducer elements are selected from a supply of transducer elements so as to maximize similarity of relevant parameters for said two transducer elements.

3. The transducer arrangement according to claim 1, wherein each of said two transducer elements comprise a substantially planar active member located in a common plane.

4. The transducer arrangement according to claim 1, further comprising:

a transducer housing adapted for mounting said two transducer elements on a drill collar or sub in the drill string, said transducer housing having a recessed part accommodating said two transducer elements.

5. The transducer arrangement according to claim 4, wherein said transducer housing has an elongate shape having a longitudinal axis adapted for corresponding to an axial direction of said drill collar or sub.

6. The transducer arrangement according to claim 5, wherein said recessed part is provided in a central housing section of said transducer housing, said transducer housing further comprising an electronics housing section at a first side of said central housing section, and a pressure compensation section at a second side of the said central housing section, said first side is opposite to said second side along said longitudinal axis of the transducer housing.

7. The transducer arrangement according to claim 6, further comprising:

a liquid-filled cavity behind each transducer element in said central housing section and, a separate passage for connecting each liquid-filled cavity to the common liquid-filled reservoir.

8. The transducer arrangement according to claim 7, wherein each said separate passage comprises a throttling valve for adjusting the flow cross section between a respective liquid-filled cavity and said common liquid-filled reservoir.

9. The transducer arrangement according to claim 1, wherein the output terminals of said two transducer elements are connected together in series.

10. The transducer arrangement according to claim 3, wherein said substantially planar active member is a membrane type of element.

11. The transducer arrangement according to claim 3, wherein said substantially planar active member is a bender type of element.

12. The transducer arrangement according to claim 4, further comprising:

a protective compound in said recessed part for covering each transducer element.

13. The transducer arrangement according to claim 4, further comprising:

an acoustic window in said recessed part for covering each transducer element.

14. The transducer arrangement according to claim 8, wherein each throttling valve is an acoustic low pass filter.

* * * * *